United States Patent
Blaschke et al.

(10) Patent No.: US 6,312,743 B1
(45) Date of Patent: *Nov. 6, 2001

(54) COOKIE DOUGH

(75) Inventors: Dieter Blaschke, La Tour-de-Peilz; Peter Nairn, St-Legier, both of (CH)

(73) Assignee: Nestec SA, Vevey (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/433,557

(22) Filed: Nov. 4, 1999

Related U.S. Application Data

(63) Continuation-in-part of application No. PCT/EP98/03848, filed on Jun. 24, 1998, and a continuation-in-part of application No. PCT/EP97/07190, filed on Dec. 17, 1997.

(30) Foreign Application Priority Data

Dec. 19, 1996 (EP) .................................................. 96203630

(51) Int. Cl.⁷ .................................................... A21D 10/02
(52) U.S. Cl. .............................. 426/144; 426/76; 426/94; 426/128; 426/549
(58) Field of Search ................................ 426/128, 76, 94, 426/549, 144

(56) References Cited

U.S. PATENT DOCUMENTS

| | | | |
|---|---|---|---|
| 1,319,899 | 10/1919 | Rafert | 426/76 |
| 1,929,358 | 10/1933 | Keefer | 426/76 |
| 1,952,698 | 3/1934 | Willem | 31/5 |
| 3,024,112 | 3/1962 | Burgess | 426/497 |
| 3,397,064 | 8/1968 | Matz | 99/90 |
| 3,765,909 | 10/1973 | Moline | 99/192 R |
| 4,215,104 | 7/1980 | Ullman et al. | 424/15 |
| 4,445,835 | 5/1984 | Wasserbach | 425/131.1 |
| 4,517,209 | 5/1985 | Thornton et al. | 426/383 |
| 4,777,057 | 10/1988 | Sugisawa et al. | 426/412 |
| 4,859,473 | 8/1989 | Arcisszewski et al. | 426/19 |
| 4,900,577 | 2/1990 | Arciszewski et al. | 426/563 |
| 5,049,399 | 9/1991 | Huang et al. | 426/87 |
| 5,171,599 | 12/1992 | Weber | 426/549 |
| 5,349,759 | 9/1994 | Anton et al. | 33/524 |
| 5,523,107 | 6/1996 | Wallin | 426/549 |
| 6,024,997 | * 2/2000 | Blaschke et al. | 426/144 |

FOREIGN PATENT DOCUMENTS

| | | |
|---|---|---|
| 1338372 | 6/1996 | (CA) . |
| 94 17 488 | 1/1995 | (DE) . |
| 0 084 210 | 7/1983 | (EP) . |
| 0 145 550 | 6/1985 | (EP) . |
| 0 214 707 | 3/1987 | (EP) . |
| 0 900 527 A2 | 3/1999 | (EP) . |
| 461263 | 3/1937 | (GB) . |
| 90/01877 | 3/1990 | (WO) . |
| WO 92/10101 | 6/1992 | (WO) . |
| WO 97/31539 | 9/1997 | (WO) . |

OTHER PUBLICATIONS

Riddle, J.S., "Frookies to Offer Cookies to In–Store Departments," Supermarket News, 40(26):40 (1990).
Copy of packaging for "Snap to Bake Cookies" manufacturing by Pampas, A Division of Quality Bakers Australia Limited.
Brochure from Ready–Bake International titled "Gourmet Cookies".

* cited by examiner

Primary Examiner—Lien Tran
(74) Attorney, Agent, or Firm—Winston & Strawn

(57) ABSTRACT

A ready-for-use cookie dough which can be preserved in the refrigerator and which is prepared from flour, sugar, baking powder and fat, containing between about 0.3 and 1.5% baking powder and provided in a precut form or in a form with grooves. Preferably, the dough is provided with score lines or grooves that define equally sized portions that can be broken off or pulled apart and then baked to form individual cookies. In addition, the block can be formed of different dough layers or strips, or each portion can be provided with a different color, stamping, decoration or filling. If desired, the portions can be of different configurations or shapes.

22 Claims, 3 Drawing Sheets

COOKIE DOUGH

CROSS REFERENCE TO RELATED APPLICATIONS

This application is a continuation-in-part of each of PCT/EP97/07190 filed Dec. 17, 1997 and PCT/EP98/03848 filed Jun. 24, 1998, both of which are currently pending and designate the United States.

BACKGROUND OF THE INVENTION

The invention relates to a ready-for-use cookie dough which can be preserved in the refrigerator and which is prepared from flour, sugar, baking powder and fat.

Cookie doughs already exist on the market. This dough exists in tubular form or it is packaged in a cup. During use, the consumer should use a spoon or a knife and form the cookie in circular form before baking it, which requires manipulation of the dough. If the packaging of this cookie dough is made in the form of a block, a forming device is needed in order to give the cookie the desired circular form. In this case, the forming leaves pieces which must then be replaced or reworked.

SUMMARY OF THE INVENTION

The present invention now provides the consumer with a ready-for-baking cookie dough which does not require any manipulation during use and which does not leave any dough pieces to be recycled or worked.

The invention relates to a ready-for-use cookie dough which can be preserved in the refrigerator and which is prepared from flour, sugar, baking powder and fat, in which the content of baking powder is between about 0.3 and 1.5% and which is provided in a precut form ready for baking or preferably in a form having grooves or score lines which define the pieces of the dough that are to be broken off and baked into cookies.

This is conveniently achieved in the preferred embodiment by providing the dough in the form of a block, preferably a rectangular block, which includes grooves criss-crossing the length and width of the block to define square or rectangular sections or portions that can be broken away from the others and then baked to form individual cookies.

In addition, if desired, the pieces of the dough can be provided with different colors, with specific figures, or with decorations thereon to enable the consumer to prepare these differences in the final cookie products from the single dough block.

BRIEF DESCRIPTION OF THE DRAWINGS

Preferred embodiments of the invention can be observed by reviewing the following detailed description and appended drawing figures, wherein.

DETAILED DESCRIPTION OF THE INVENTION

Figure 1:
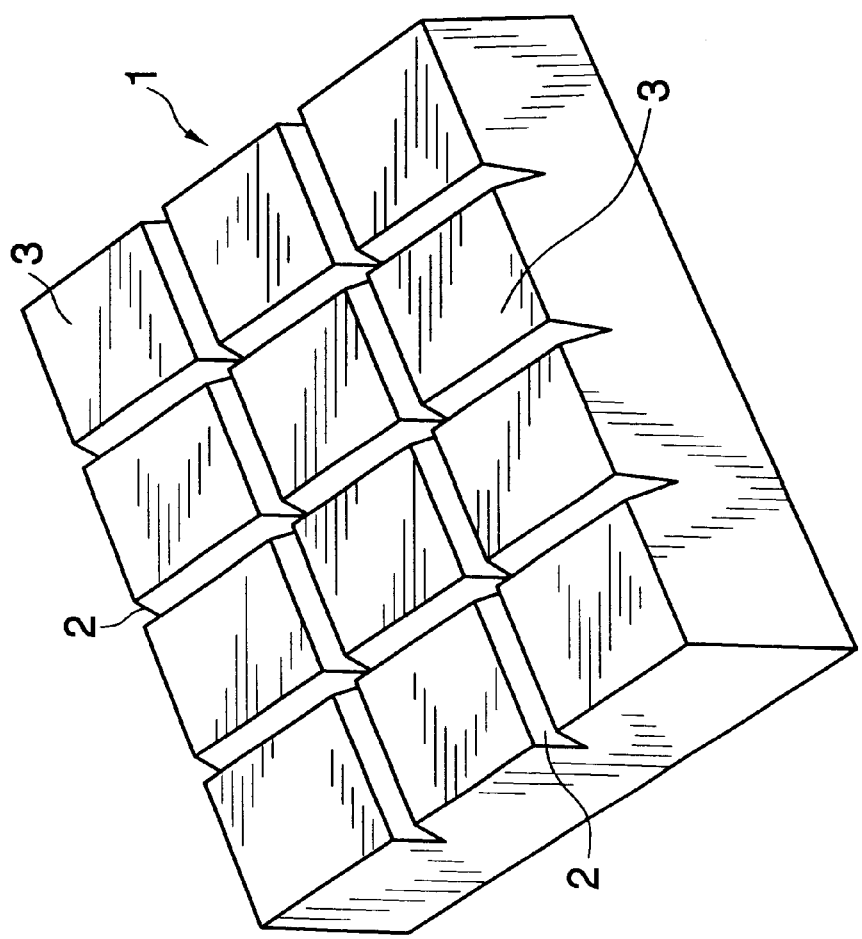
FIG. 1 is a perspective view of a block of cookie dough in accordance with a first embodiment of the invention.

The cookie dough according to the invention is provided in the form of a block. This block may be either of paralle lepipedal form, cylindrical form, or prismatic form. The block is a solid or semi-solid that is typically kept under refrigerated conditions and easily separated into discrete segments for baking. In particular, the block can be broken into smaller segments along the score lines provided on the body and preferably on the upper surface.

It has been observed that if a dough, which has a baking powder content as mentioned above, is used, it can be cut in the form of parallelepidpedal, circular or prismatic blocks and that these forms deposited on a baking tray and placed in the oven for baking flow during the baking step to provide cookies having a circular form.

To facilitate separation of the pieces, it is necessary to have a block of dough in which either an imprint or a score line has been made so as to facilitate breaking in order to make small blocks which are placed directly for oven baking. It is therefore sufficient to have a knife with which cuts are made fully in the grooves, or the rectangular blocks, the circular pieces or the triangular pieces are even simply broken off or pulled out if they are already scored. There is thus no waste due to forming and no manipulation, other than cutting or breaking, on the part of the consumer.

In the present description, the contents are given by weight. Baking powder is understood to mean a mixture of at least one bicarbonate or carbonate salt, at least one acidifying agent, and at least one separating agent. None of the constituents of this mixture is critical. Sodium bicarbonate is preferably used with sodium diphosphate or disodium dihydrogen pyrophosphate with a starch as separating agent. These mixtures are directly available commercially with a fixed composition. For example, the bicarbonate is present in an amount of about 30%, the acid in an amount of about 40% and the separating agent in an amount of about 30%. In a specific embodiment, it is also possible to use only sodium bicarbonate, in an amount of about 0.2 to 0.7%, preferably about 0.5%.

The flour used is a cereal flour with a high content or with a lower content of proteins. Any type of flour can be taken into consideration. The flour content is normally between about 10 and 40%, preferably between about 27 and 34%.

The sugar used is not critical. Its content is between about 10 and 40%. The sugars that can be used are fructose, sucrose, dextrose and maize syrup. Sucrose is preferred, for example, in the form of granulated sugar. The resultant dough should have a good resistance during preservation in the refrigerator, that is to say that it should be quite hard, but should nevertheless spread well during baking so as to develop in a circular form. It is also necessary to have a dough having a water content of the order of about 6 to 9%. In order to increase the sugar content, it is also possible to add a sugar substitute, such as sorbitol or any other known sugar substitute.

The fat used in the dough composition according to the invention is a solid or liquid fat at room temperature. It can be of animal or plant origin, for example lard, tallow, margarine, maize oil, copra oil, palm oil, sunflower oil, soya bean oil. It is also possible to use fat mixtures. These fats are emulsified or stabilized with mono- or diglycerides or other emulsifiers known in the art. For example, according to the invention, margarine, which already contains the emulsifier, is used. The fat content is between about 10 and 25%. The type of fat used also has an influence on the flow capacity of the dough during baking.

As a texturing agent, whole egg or egg white at a content of between about 0 and 10% is used, preferably at a content of about 2 to 5%.

The dough according to the invention may also contain flavoring agents, such as vanilla flavor and cocoa powder.

This dough may also contain chocolate in the form of pieces, pieces of oat flakes or groundnut pieces. It is also possible to have pieces or whole hazel nuts. The size of these pieces is not critical and may vary between about 1 and 10 mm. Dark, milk or white chocolate may be used. The content of chocolate is between about 10 and 30%. The chocolate used is a commercial chocolate or a chocolate which can be used in pastry making or in catering.

It is very convenient according to the invention to have a block of dough already having the correct thickness in order to avoid having to further roll out the dough. To this effect, a block is obtained which has a thickness of between about 1 and 3 cm.

As regards the scored dough block, it is envisaged so as to make it into parallelepipdedal blocks of between about 3 and 4 cm in size and about 1 to 3 cm thick. If a cylindrical block is available, circles having a diameter of between about 3 and 6 cm and a thickness of between about 1 and 3 cm are made. In the case of a prismatic block, a thickness of between about 1 and 3 cm and an equilateral triangle with about 3 to 6 cm sides are envisaged.

The grooves are normally provided which have a width of the order of about 1 to 5 mm and an identical depth. In this case, the consumer should either break the blocks like for a chocolate bar, or use a knife to finish the cutting along the grooves. Alternatively, the depth and width of the grooves may be defined as a ratio or percentage of the thickness of the block. Thus, the invention encompasses grooves having depths and widths which are each about 3% to about 50%, preferably about 7.5% to 35% and more preferably about 10% to 25% of the thickness of the block. These grooves are preferably V-shaped, although other configurations, such as U-shaped, rounded or rectangular grooves, can be used.

As a practical embodiment, the dough thickness may be about 2 cm in order to make about 3.5×3.5 cm blocks. For a block of about 300 g, there would be about 3 ×3 blocks, for a block of about 400 g, about 3×4 blocks and for a block of about 500 g, about 3×5 blocks.

When the blocks are ready, they are arranged on an oven tray and the baking is carried out conventionally, that is to say, at a temperature of about 180° C. for about 12 to 18 minutes. After baking, a cookie having a diameter of about 7 cm is obtained for blocks of about 3.3×3.5 cm.

Cookies which are quite round are obtained by virtue of the dough according to the invention using blocks whose form is substantially square.

The block of dough is wrapped conventionally, for example in a wrapping based on synthetic material or based on covered carton, so as to be protected from air and moisture prior to use. The shelf life of the dough according to the invention in a refrigerator is normally on the order of several months.

According to FIG. 1, the block (1) of cookie dough is prepared with the composition as stated in Example 1. The preparation is made conventionally and when the block is formed, marker rolls which make it possible to form the grooves (2) are made to pass over it. The choice therefore exists either to make only imprints or to make a complete notch or cut. At the time of use, it is sufficient to break off, one by one, the various blocks formed (3) and to place them on a tray to put in the oven for baking into individual cookies.

The invention also relates to a ready-for-use cookie dough in the form of a block which exhibits one or more of the following features:

a) at least two different layers,
b) at least two different strips for each piece taken from the block,
c) the same or a different stamping on the top of each piece,
d) the same or a different decoration on the top of each piece,
e) a filling which is different from the basic dough and is the same or different in each piece, or
f) scored or precut forms of different specific shapes or sizes.

In one embodiment of the invention, the block has at least two different layers. The number of layers is not critical, but from a possible point of view, this number of layers is typically between 2 and 6. Preferably, the number of layers is 2. These layers are more specifically of different compositions. This can be done for example by adding to the basic dough different types of flavors or colors, which are accepted in the food area. For example, it is possible to have the basic dough as first layer and dough added with cocoa as the second layer, wherein the resultant cookie has both a clear face and a dark face. The layered dough can be produced either by extrusion, sheeting, or by other methods known in the art.

In another embodiment of the invention, the block has at least two different strips for each piece taken from the block. The number of strips is not critical, but typically is between 2 and 6. Preferably, the number of strips is 4. If desired, the dough strips may be of different compositions that can be prepared, for example, by adding to the basic dough different types of acceptable food grade flavors or colors. For example, it is possible to have the basic dough as a first strip and a dough that contains cocoa as a second strip. The resultant cookie thus has a clear portion and a dark portion. Multiple dough strips can be produced by the same methods used for producing the layers, i.e., by extrusion, sheeting, or other methods known in the art. Also, the strips can be placed in adjacent relation either horizontally or vertically in the dough block.

In another embodiment of the invention, each piece of the dough block is stamped on the top with a recognizable design or image, for example, an animal or a geometric shape. In this case, conventional stamping devices are used for creating an indentation on the top of the pieces. The dough can be a classical dough in its composition since the ornamentation is visible on the top face of the cookie.

In yet another embodiment of the invention, each piece of the block receives a decoration on the top face. This decoration can be either precisely placed or randomly put on the tops of the pieces of the block. Typical decorations are seeds, for example sesame seeds, icing, sugar balls, or other decorations. The way to put the decoration on the top of the pieces can be either by a sprinkling device or by manual, robotic or mechanical means, all of which are generally known in the art.

In another embodiment of the invention, the block of dough has a filling for each piece, which the filling is different from the basic dough. The filling can be either a creamy or a liquid filling, such as caramel, or chocolate, or cream. The filling can also be a solid filling, such as a chocolate dough or another aromatized dough. In the case of a liquid filling, the filling remains inside the basic dough after cooking. The amount of the filling is not critical: this filling can represent from about 5 to 50% of the piece of dough. The way of producing the block is either by coextrusion, injection, or placing the filling in a first layer nd then putting a second layer of dough on the filling and first layer.

In yet another embodiment of the invention, the block has scored or precut forms of different specific shapes or sizes. The aim is to have different shapes or sizes on the same block without having to recycle or reuse any part of the dough. For example, it is possible to have geometrical shapes, such as triangles, squares, rectangles, animal shapes, or any other shape.

Figure 2:
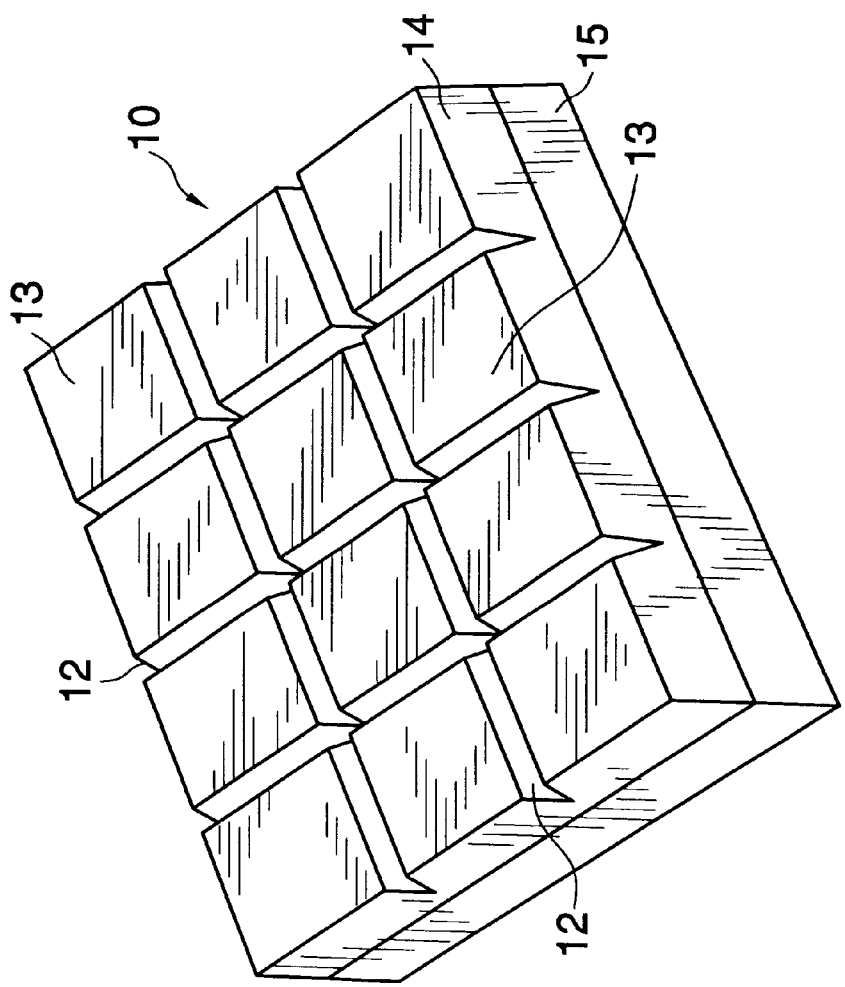
FIG. 2 is a perspective view of a block of cookie dough in accordance with another embodiment of the invention.
Figure 3:
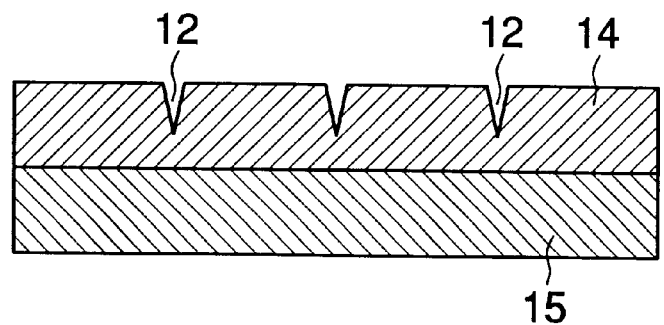
FIG. 3 is a cross-sectional view of the cookie dough block of FIG. 2, viewed in a perpendicular direction to the longitudinal axis of the block.

According to FIGS. 2 and 3, the block (10) of cookie dough is prepared with the composition stated in Example 5. The preparation is made by sheeting and when the block is formed, marker rolls, which make it possible to form the grooves (12), are made to pass over it. At the time of use, it is sufficient to break off, one by one, the various pieces or dice (13) formed and place them on a tray to put in the oven. If desired, the dice (13) are formed with two layers: the top layer (14) made with a classical dough and the lower layer (15) made with the same dough but with the addition of cocoa.

Figure 4:
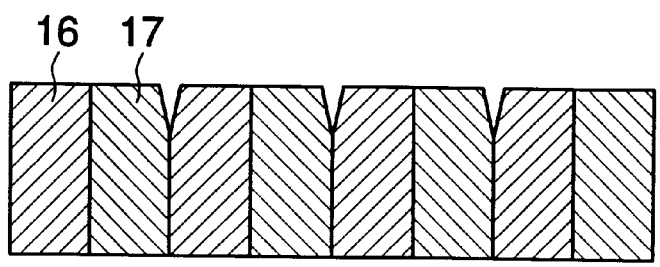
FIGS. 4 and 5 are cross-sectional views of additional embodiments of cookie dough blocks of the invention.

FIG. 4 gives a section with two strips (16) and (17). Each dice, which has been broken, has both strips (16) and (17). For example, strip (6) is the classical dough as described previously and strip (17) is the same dough that contains cocoa.

Figure 5:
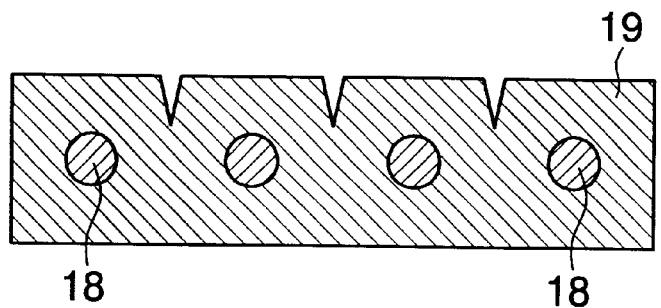

Another embodiment of the invention is shown in FIG. 5, which illustrates a section through the middle of the dice. In this case, there is a filling (18) embedded in the dough (19). The filling is not critical, the only condition being that the filling must be capable of withstanding the baking process. The filling can be a fruit jam, chocolate, hazel nut, or a mixture of chocolate and hazel nut. The ratio dough/filling is not critical: this ratio is normally between about 40/60 and 60/40.

EXAMPLES

The remainder of the description is made with reference to the examples, which illustrate preferred embodiments of the invention.

Examples 1 to 4

The various ingredients stated in the table below are mixed: the proportions are in % by weight.

| EXAMPLES | 1 | 2 | 3 | 4 |
| --- | --- | --- | --- | --- |
| Sugar | 33.5 | 34 | 33.8 | 34.1 |
| Whole Egg | 3.5 | 3.5 | 3.5 | 3.5 |
| Baking Powder | 0.7 | 1.00 | 1.5 | 1.5 |
| Salt | 0.3 | 0.3 | 0.3 | 0.3 |
| Fat | 12.8 | 12.9 | 12.8 | 13 |
| Water | 4.4 | 3.2 | 3.2 | 2.1 |
| Flavorings | 0.6 | 0.5 | 0.6 | 0.7 |
| Flour | 28 | 28.3 | 28.1 | 28.4 |
| Chocolate pieces | 16.2 | 16.3 | 16.2 | 16.4 |

The dough thus prepared is stored for 3 weeks in the refrigerator and 3.5×3.5 cm cookies are then made. After baking for 16 minutes at 180° C., cookies 7 cm in diameter are obtained.

For Example 1, the dough is considered too soft, for Examples 2 and 3, it is a little soft and for the last example, the consistency is judged to be good, in the light of the possibility of manufacturing the dough on an exiting production line. In each case, the dough blocks flows in a manner which is quite circular.

Example 5

The various ingredients stated in the table below are mixed for making a ready-for-use cookie dough with two layers. The amounts are in weight %.

| Example | Clear dough | Dark dough |
| --- | --- | --- |
| Sugar | 33.3 | 34.5 |
| Whole egg | 9.5 | 9.4 |
| Baking powder | 0.5 | 0.5 |
| Salt | 0.5 | 0.5 |
| Fat | 15 | 15.6 |
| Water | 3.1 | 3.8 |
| Flavorings | 0.1 | 0.1 |
| Flour | 38 | 33.2 |
| Cocoa | — | 2.4 |

The two-layer dough is made by sheeting and the dough is stored 3 weeks in the refrigerator. 3.5 by 3.5 cm cookies are then made. After baking for 16 minutes at 180°C., cookies 7 cm in diameter are obtained.

Example 6

This is an example for cookies that have a filling. The basic dough is the dough of the preceding Example 5 (clear dough). The filling is an apricot jam with a dough/jam ratio of 70/30. These cookies are produced by coextrusion. As before, the dough is stored in the refrigerator and cookies of the same size are produced. During the cooking the dough opens and the jam flows on the top of the cookies.

Example 7

This is an example of a block with different shapes according to one embodiment of the invention. The block of dough has a thickness of 3 mm and different geometrical forms. The composition is the same as for the clear dough of Example 5 except the baking powder content is zero and the fat content is 15.5%.

Although the invention has been fully disclosed in detail herein, one of ordinary skill in the art is readily cognizant of numerous variations and modifications that can be made. Also, although the final cookie products can be individual and separated, if insufficient room is provided between the pieces during baking, the final cookie products may contact each other without departing from the teachings herein. It is intended that the appended claims cover all variations and modifications that fall within the true spirit and scope of this disclosure.

What is claimed is:

1. A ready-for-use refrigerated cookie dough which is prepared from flour, sugar, baking powder and fat, wherein the baking powder is present in an amount of between about 0.3 and 1.5% and the dough is provided in a form of a sheet or block having a thickness and a surface which includes grooves or score lines thereon that define pieces of the dough to be broken off and baked into cookies, wherein the grooves or score lines have depths and widths which are each between about 3% to about 50% of the thickness of the sheet or block.

2. The cookie dough of claim 1, in the form of a parallelepiped al, cylindrical or prismatic block having a surface which includes V-shaped, U-shaped, rounded or rectangular grooves or score lines therein.

3. The cookie dough of claim 2 wherein the grooves or score lines define portions of the block that are of substantially equal size.

4. The cookie dough of claim 2, wherein the block is between about 1 and 3 cm thick and the grooves or score lines have a width of between about 1 and 5 mm.

5. The cookie dough of claim 2, wherein the grooves or score lines have a width of between about 1 and 5 mm and a depth of between about 1 and 5 mm.

6. The cookie dough of claim 1 having a flat circular shape with a diameter of between about 3 and 6 cm and a thickness of between about 1 and 3 cm.

7. The cookie dough of claim 1, which contains between about 6 and 9% water.

8. The cookie dough of claim 7 in the form of a sheet having a thickness of between about 1 and 3 cm.

9. The cookie dough of claim 1, further including pieces of chocolate in an amount of between about 10 and 30% by weight of the dough.

10. The cookie dough of claim 9, wherein the chocolate pieces are between about 1 and 10 mm in size.

11. The cookie dough of claim 1, wherein the flour is present in an amount of between about 10 and 40% by weight, the sugar is present in an amount of about 10 and 40% by weight, and the fat is present in an amount of between about 10 and 25% by weight, and further including a texturizing agent in an amount of up to 10%.

12. The cookie dough of claim 11, wherein the texturizing agent is whole egg or egg white and is present in an amount of between about 2 and 5% by weight.

13. The cookie dough of claim 1 in the form of a block having at least two different layers of dough.

14. The cookie dough of claim 1 in the form of a block wherein each piece includes at least two different dough strips.

15. The cookie dough of claim 1 wherein at least some of the pieces have different colors.

16. The cookie dough of claim 1 wherein at least some of the pieces have a filling therein.

17. The cookie dough of claim 1 wherein at least some of the pieces have a different filling therein.

18. The cookie dough of claim 1 wherein at least some of the pieces have different surface decorations.

19. The cookie dough of claim 1 in the form of a block that defines pieces of different sizes or shapes.

20. The cookie dough of claim 1 wherein the grooves or score lines intersect to define dough pieces therebetween.

21. A ready-for-use refrigerated cookie dough which is prepared from flour, sugar, a bicarbonate compound and fat, wherein the bicarbonate is present in an amount of between about 0.2 and 0.7% and the dough is provided in a form of a sheet or block having a thickness and a surface which includes grooves or score lines thereon that define pieces of the dough to be broken off and baked into cookies, wherein the grooves or score lines have depths and widths which are each between about 3% to about 50 % of the thickness of the sheet or block.

22. The cookie dough of claim 21 wherein the bicarbonate compound is sodium bicarbonate and the grooves or score lines intersect and have a width of about 1 to 5 mm.

* * * * *

UNITED STATES PATENT AND TRADEMARK OFFICE
CERTIFICATE OF CORRECTION

PATENT NO. : 6,312,743 B1  
DATED : November 6, 2001  
INVENTOR(S) : Blaschke et al.

Page 1 of 1

It is certified that error appears in the above-identified patent and that said Letters Patent is hereby corrected as shown below:

<u>Column 6,</u>
Line 62, change "parallelepiped al" to -- parallelepipedal --.

Signed and Sealed this

Nineteenth Day of March, 2002

Attest:

Attesting Officer

JAMES E. ROGAN
*Director of the United States Patent and Trademark Office*